United States Patent
Guo et al.

(10) Patent No.: US 10,922,737 B2
(45) Date of Patent: Feb. 16, 2021

(54) INTERACTIVE PRODUCT RECOMMENDATION METHOD AND NON-TRANSITORY COMPUTER-READABLE MEDIUM

(71) Applicant: Industrial Technology Research Institute, Hsinchu (TW)

(72) Inventors: Chien-Yang Guo, Taichung (TW); Yun-Cheng Chou, Hsinchu County (TW); Chin-Sheng Yeh, Taoyuan (TW); Chih-Pin Su, Taoyuan (TW); Shin-Yi Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 282 days.

(21) Appl. No.: 15/852,323

(22) Filed: Dec. 22, 2017

(65) Prior Publication Data
US 2019/0197598 A1    Jun. 27, 2019

(51) Int. Cl.
*G06Q 30/06* (2012.01)

(52) U.S. Cl.
CPC ..... *G06Q 30/0631* (2013.01); *G06Q 30/0627* (2013.01); *G06Q 30/0643* (2013.01)

(58) Field of Classification Search
CPC ............... G06Q 30/02; G06Q 30/0631; G06Q 30/0633; G06Q 30/0641; G06Q 30/0643; G06Q 30/0601–0645

(Continued)

(56) References Cited

U.S. PATENT DOCUMENTS 6,466,918 B1 * 10/2002 Spiegel .................. G06Q 30/02
                                                                    705/7.29
7,668,821 B1 *  2/2010 Donsbach .......... G06Q 30/0631
                                                                    707/765

(Continued)

FOREIGN PATENT DOCUMENTS

CN          102591972 A      7/2012
CN          105469263 A      4/2016

(Continued)

OTHER PUBLICATIONS

Hahn, J. (2003). Measuring the effectiveness of e—commerce website design and its impact on business value (Order No. 3113178). Available from ProQuest Dissertations and Theses Professional. (305331594). Retrieved from https://dialog.proquest.com/professional/docview/305331594?accountid=131444.*

(Continued)

*Primary Examiner* — Resha Desai

(57) ABSTRACT

A interactive product recommendation method is provided, including: selecting a target product from the plurality of products; loading the product information of the target product; generating a product list according to the product characteristics corresponding to the target product and the user preferences corresponding to at least one user; generating a first label list based on at least one product characteristics corresponding to the target product and the user preferences corresponding to the user, where the first label list has a plurality of first labels corresponding to different product features; and displaying the product information, the product list and the first label list in a user interface. When clicking the icon, displaying another user interface corresponding to the clicked icon. When clicking the first label, updating the product list according to the clicked first label.

18 Claims, 6 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 7,949,573 B1* | 5/2011 | Cohen | G06Q 30/02 |
| | | | 705/14.54 |
| 8,015,140 B2 | 9/2011 | Kumar et al. | |
| 8,019,707 B2 | 9/2011 | Shani et al. | |
| 8,122,020 B1 | 2/2012 | Donsbach et al. | |
| 8,209,320 B2 | 6/2012 | Reitter et al. | |
| 8,280,783 B1* | 10/2012 | Brownell | G06Q 30/00 |
| | | | 705/26.1 |
| 8,560,398 B1* | 10/2013 | Gregov | G06Q 30/06 |
| | | | 705/26.2 |
| 8,566,261 B2* | 10/2013 | Mital | G06Q 50/01 |
| | | | 706/12 |
| 8,660,912 B1* | 2/2014 | Dandekar | G06Q 30/06 |
| | | | 705/26.1 |
| 8,751,507 B2* | 6/2014 | Kim | G06F 16/335 |
| | | | 707/748 |
| 9,038,000 B2* | 5/2015 | Haynes, II | G06F 17/241 |
| | | | 715/838 |
| 9,390,168 B1* | 7/2016 | Dykstra | G06F 16/686 |
| 9,558,270 B2* | 1/2017 | Hanses | G06F 16/38 |
| 9,697,538 B2 | 7/2017 | Balasubramanian et al. | |
| 10,198,514 B1* | 2/2019 | Krotkov | G06F 16/9535 |
| 10,198,524 B1* | 2/2019 | Amalapurapu | G06F 16/9535 |
| 2007/0174089 A1 | 7/2007 | Koo et al. | |
| 2010/0250336 A1* | 9/2010 | Selinger | G06Q 30/0643 |
| | | | 705/26.7 |
| 2010/0293494 A1* | 11/2010 | Schmidt | G06Q 30/02 |
| | | | 715/772 |
| 2012/0158622 A1 | 6/2012 | Mital et al. | |
| 2015/0142787 A1* | 5/2015 | Kimmerling | G06F 16/252 |
| | | | 707/723 |

FOREIGN PATENT DOCUMENTS

| | | |
|---|---|---|
| CN | 106372961 A | 2/2017 |
| CN | 106408365 A | 2/2017 |
| CN | 106485562 A | 3/2017 |
| CN | 106600372 A | 4/2017 |
| CN | 106708821 A | 5/2017 |
| CN | 103493068 B | 6/2017 |
| CN | 107154109 A | 9/2017 |
| CN | 107274242 A | 10/2017 |
| CN | 107392718 A | 11/2017 |
| CN | 107464162 A | 12/2017 |
| TW | I433042 | 4/2014 |
| TW | 201601104 A | 1/2016 |
| TW | I554957 | 10/2016 |
| TW | I567765 | 1/2017 |
| WO | WO 2015153125 | 10/2015 |

OTHER PUBLICATIONS

Harald Steck et al., "Interactive Recommender Systems," RecSys '15 Proceedings of the 9th ACM Conference on Recommender Systems, Sep. 2015, pp. 359-360, ACM, US.

Jannach et al., "User Control in Recommender Systems Overview and Interaction Challenges, User Control in Recommender Systems," International Conference on Electronic Commerce and Web Technologies, Feb. 2017, pp. 21-33, Springer International Publishing, US.

China Patent Office, Office Action, Patent Application Serial No. 20171146861.4, dated Nov. 25, 2020, China.

* cited by examiner

INTERACTIVE PRODUCT RECOMMENDATION METHOD AND NON-TRANSITORY COMPUTER-READABLE MEDIUM

TECHNICAL FIELD

The present disclosure relates to an interactive product recommendation method and a non-transitory computer-readable medium.

BACKGROUND

In many existing shopping websites and shopping applications, when a user clicks on a product of interest, the electric merchant may provide further information or other products that are related to the product of interest in the display page. However, in the prior art, the recommended functions mostly only display products that are recommended to the user, but they cannot instantly reflect the characteristics of the product that the user is currently interested in. Therefore, how to provide a better list of recommendations is a problem that needs to be solved immediately.

SUMMARY

An embodiment of the present disclosure provides an interactive product recommendation method, including: choosing a target product from a plurality of products; loading product information corresponding to the target product; generating a product list having a plurality of icons corresponding to different products based on correlations between the products and a user preference corresponding to at least one user; generating a first tag list based on at least one product characteristic corresponding to the target product and the user preference corresponding to at least one user, wherein the first tag list has a plurality of first tags corresponding to different product features; and displaying the product information, the product list, and the first tag list through a first user interface; wherein when any of the icons in the product list is clicked, the method loads and displays a second user interface having product information corresponding to the clicked icon; and when any of the first tags in the first tag list is clicked, the product list is updated based on the clicked first tag.

Another embodiment of the present disclosure provides a non-transitory computer-readable medium having instructions stored therein, and when the instructions are executed by a processor of an electronic device, operations performed by the electronic device include: choosing a target product from a plurality of products; loading product information corresponding to the target product; generating a product list having a plurality of icons corresponding to different products based on correlations between the products and a user preference corresponding to at least one user; generating a first tag list based on at least one product characteristic corresponding to the target product and the user preference corresponding to at least one user, wherein the first tag list has a plurality of first tags corresponding to different product features; and displaying the product information, the product list, and the first tag list through a first user interface; loading and displaying a second user interface having product information corresponding to a clicked icon when any of the icons in the product list is clicked; and updating the product list based on a clicked first tag when any of the first tags in the first tag list is clicked.

DETAILED DESCRIPTION

Further areas to which the present interactive product recommendation methods and non-transitory computer-readable mediums can be applied will become apparent from the detailed description provided herein. It should be understood that the detailed description and specific examples, while indicating exemplary embodiments of interactive product recommendation methods and non-transitory computer-readable mediums, are intended for the purposes of illustration only and are not intended to limit the scope of the invention.

Figure 1:
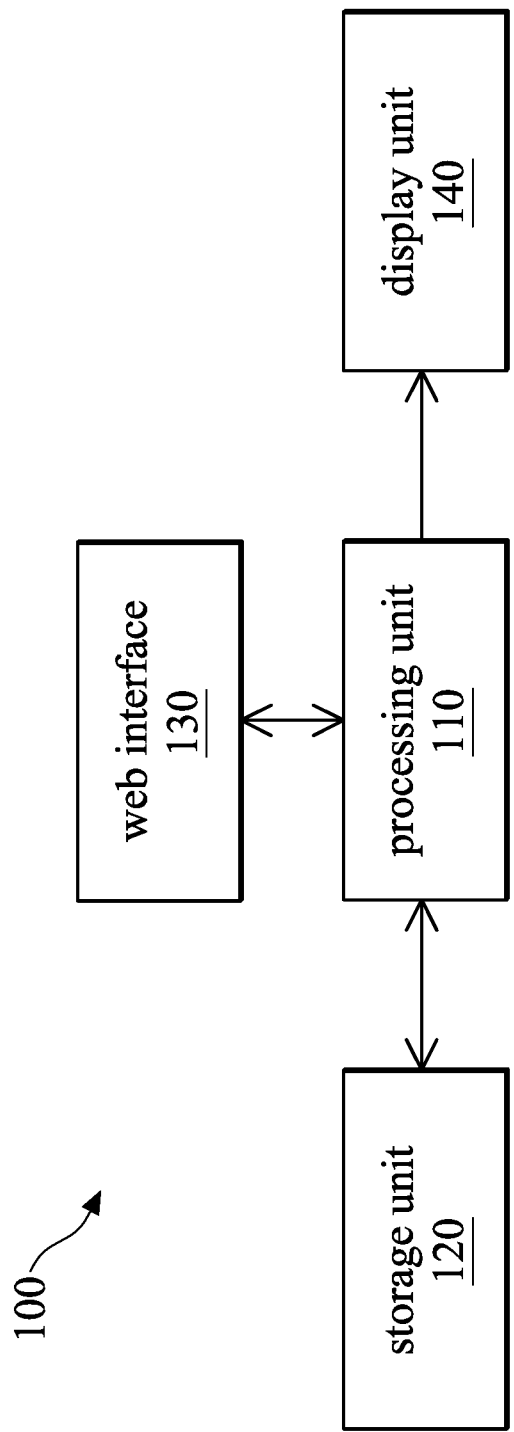
FIG. 1 is a system diagram of an electronic device in accordance with an exemplary embodiment of the present disclosure.

FIG. 1 is a system diagram of an electronic device in accordance with an exemplary embodiment of the present disclosure. The system architecture 100 can be implemented in an electronic device such as a desktop, a laptop, or a portable electronic device, such as a smartphone or a tablet, etc., and includes at least one processing unit 110. The processing unit 110 can be implemented in a variety of ways, for example, in a dedicated hardware circuit or a general hardware, such as a single processor, a multiprocessor with parallel processing capability, a graphics processor, or other processor with computational capabilities. When the processing unit 110 executes code or software, it provides the functions described below. The system architecture 100 further includes a storage unit 120 for storing information required during execution, various files and instructions for executing the methods described below, such as various algorithms, user-related information, product-related information and/or transaction content. The system architecture 100 further includes a web interface 130 for receiving at least one user's browsing behavior, a click behavior and/or a purchase behavior, and the like. The display unit 140 can be a display panel, such as a thin-film liquid crystal display panel, an organic light-emitting diode panel or other display panels, for displaying input characters, numbers, symbols, dragging mouse movements or application programs provided by the user interface to show to the user. The system architecture 100 further includes an input device (not shown), such as a mouse, a stylus or a keyboard, for the user to perform the browsing behavior, the click behavior and/or the purchase behavior.

Figure 2:
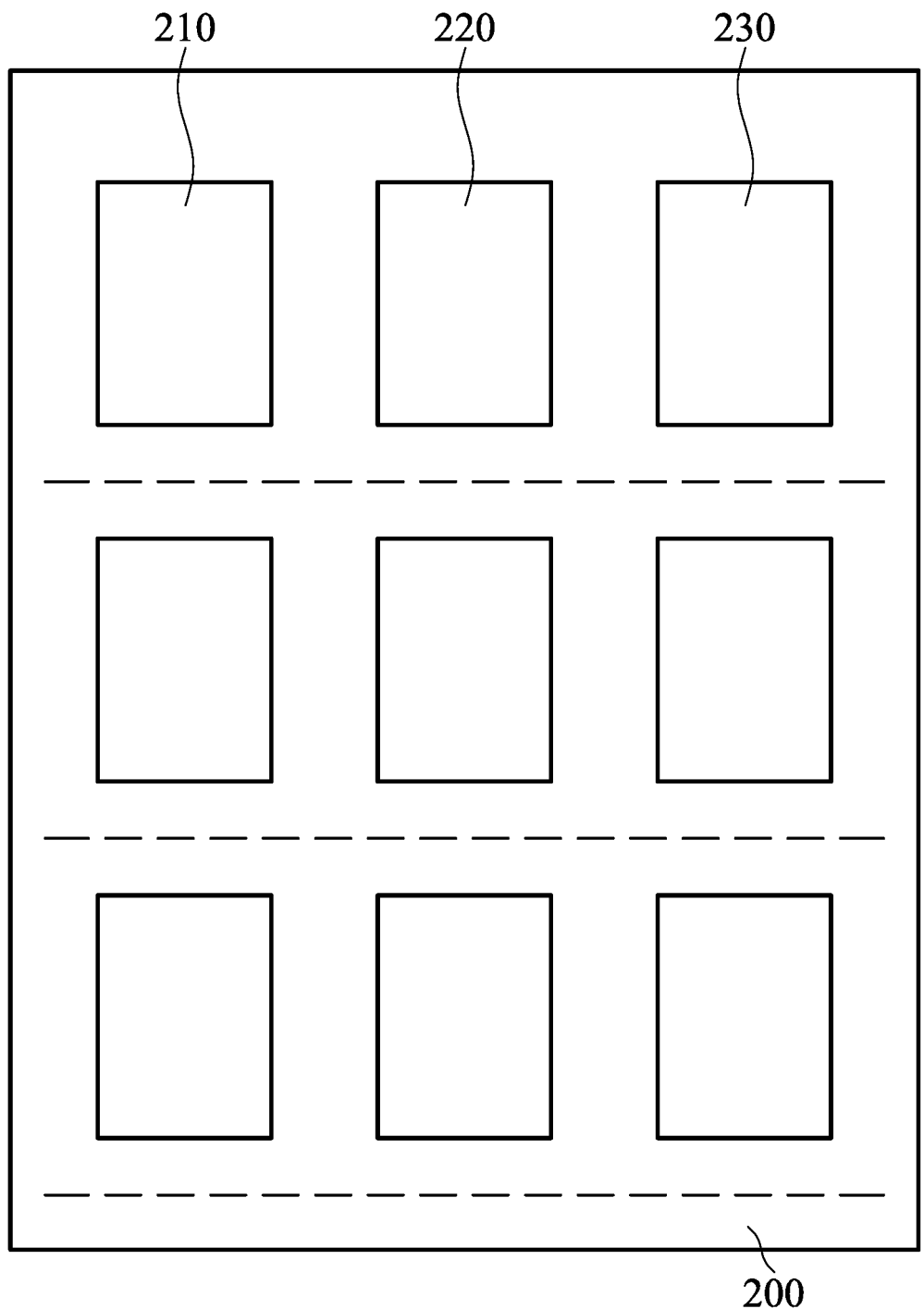
FIG. 2 is a schematic diagram of a user interface in accordance with an exemplary embodiment of the present disclosure.

FIG. 2 is a schematic diagram of a user interface in accordance with an exemplary embodiment of the present disclosure. As shown in FIG. 2, the user interface 200 displays images 210-230 representing different products. When the user clicks any of the images 210 to 230 on the user interface 200 through the input device, the processing unit 110 loads related information about the clicked product from the storage unit 120 and displays another user interface corresponding to the clicked product on the display unit 140.

Figure 3A:
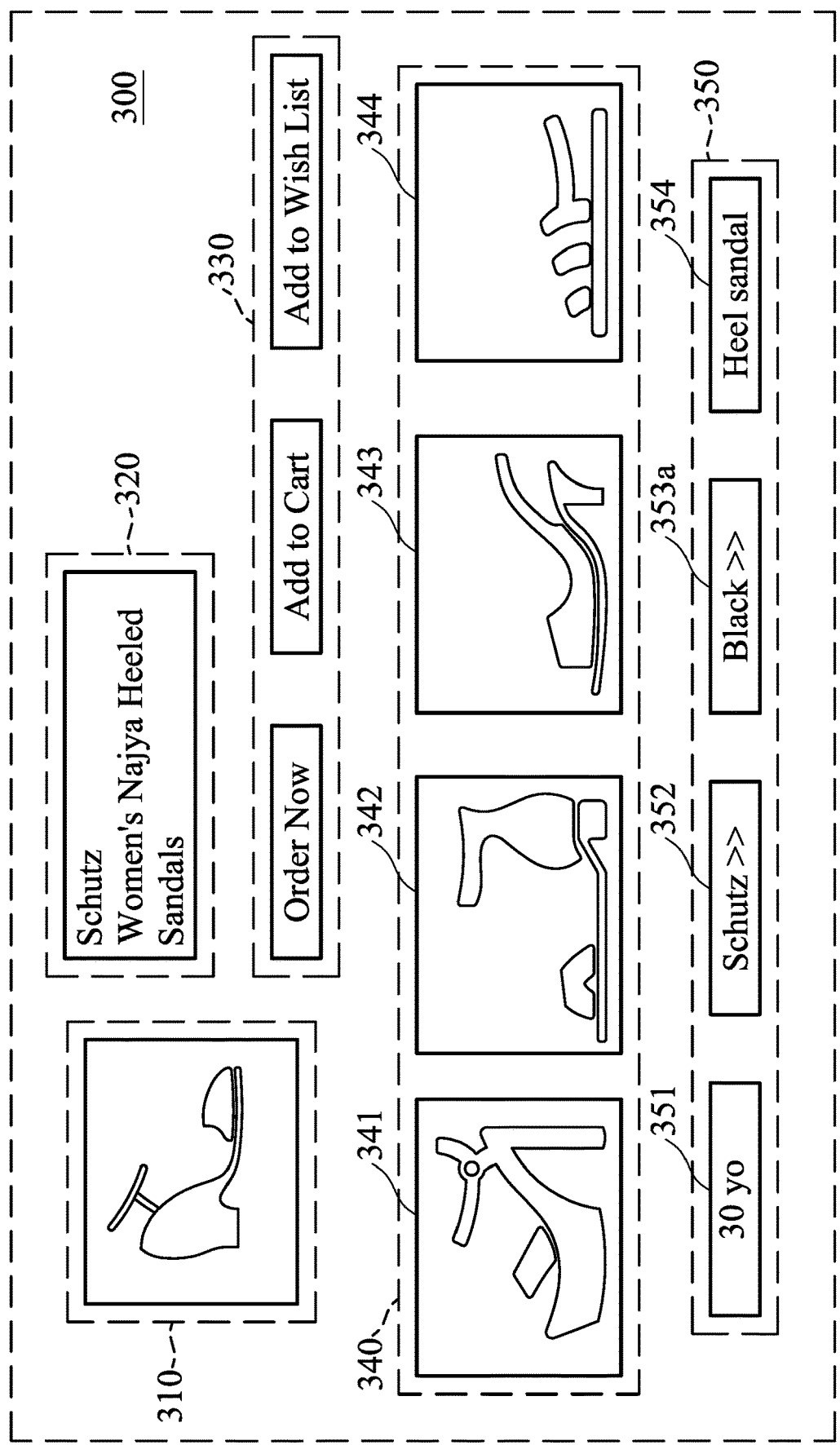
FIGS. 3A and 3B are schematic diagrams of user interfaces having a product list and a product feature list in accordance with some exemplary embodiments of the present disclosure.

FIG. 3A is a schematic diagram of a user interface having a product list and a product feature list in accordance with an exemplary embodiment of the present disclosure. As shown in FIG. 3A, the user interface corresponding to the clicked product can include an icon 310, product-related information 320, tag list 330 corresponding to different trading behaviors, a product list 340, and the list of product feature tags 350 and so on corresponding to the clicked product. The product-related information 320 can include a product name, product features, or related descriptions of the product. The product features can be obtained through a word segmenting method or the process of keeping the longest word, and through association analysis method which is behavior-based modeling (such as Association Rule Mining (AR), Collaborative Filtering (CF), Co-Ocurrence or Matrix Factorization (MF), etc.) or through association analysis method which is content-based modeling (such as Content similarity, etc.) to filter the product features that have a high correlation with the target product, thereby to generate the product feature tags. The product features can include such as a brand, a product name, materials, colors, a size, product efficacies, a price, preference group characteristics, and the like. The preference group characteristics refers to the preference of the user group of the user characteristics, such as gender, age, residential areas. The tag list 330 can include buttons of "direct purchase", "add to the shopping cart" and/or "add to wish list" for the user to perform the click behavior or the purchase behavior, but they are not limited thereto. The product list 340 displays pictures 341-344 corresponding to different products. The products corresponding to the pictures 341-344 are related to the clicked product, and they are generated according to the user's preference. For example, as shown in the figure, the product clicked in this embodiment is a women's shoe, and the product list 340 shows different styles of women's shoes. The processing unit 110 further generates different products in the product list 340 according to the following formula:

$$r_{u,i,j} = w_{ri}s_{i,j}^{ri} + w_{ltp}s_{u,j}^{ltp} \quad (1)$$

The $r_{u,i,j}$ represents the recommended score of the product, $s_{i,j}^{ri}$ represents the correlation between the product i and j, and $s_{u,j}^{ltp}$ represents the long-term preference estimation of the product j of the user u, $w_{ri}$ and $w_{ltp}$ represent the weights to adjust relative importance between correlation and long-term preference. After obtaining the recommended score, the processing unit 110 displays the products in the product list 340 according to the recommended scores. For example, the products shown from left to right represent the scores from high to low.

When the user clicks on any of the products displayed in the product list 340, the processing unit 110 loads the product information corresponding to the clicked product from the storage unit 120 and displays the product information through another user interface.

According to another embodiment of the present disclosure, the processing unit 110 can generate different products in the product list 340 according to the following formula:

$$r_{u,i,j} = w_{ri}s_{i,j}^{ri} + w_{fit}F(fb_{u,uTag}, fb_{u,iTag}, j) + w_p Pref_{u,j} \quad (2)$$

$$F(fb_{u,uTag}, fb_{u,iTag}, j) = \frac{|fb_{u,uTag} \cap fb_{u,iTag} \cap pf_j|}{|fb_{u,uTag} \cup fb_{u,iTag} \cup pf_j|} \quad (3)$$

$$ref_{u,j} = w_{op}s_{u,j}^{op} + w_{ltp}s_{u,j}^{ltp} \quad (4)$$

Wherein, $s_{i,j}^{ri}$ presents the correlation between the product i and j, $fb_{u,uTag}$ is a set of customer tags selected by the user u, and $fb_{u,iTag}$ a set of product tags selected by the user, the function F represents the correlation between the product j and the online user feedback, $Pref_{u,j}$ is the preference estimation of the product j for the user if the parameter w with subscripts are the weights to adjust relative importance between correlations and preference estimation. The preference estimation includes online preferences $s_{u,j}^{op}$ and long-term preferences $s_{u,j}^{ltp}$.

The list of product feature tags 350 displays product feature tags 351-354 corresponding to different product features. The product features includes features of the product itself, such as brand, material, size, etc., and the preference group characteristics, such as customer group, customer age, customer gender, etc. For example, in this embodiment, the features of the clicked product is about a customer age group of about "30", the brand of "Schutz", the color of "black" and the shoe style of "Heel sandal". The processing unit 110 further generates the product feature tags 351-354 according to the following formula:

$$r_{u,i,t} = w_{rt}s_{i,t}^{rt} + w_{ltp}s_{u,t}^{ltp} \quad (5)$$

$r_{u,i,t}$ represents the recommended score of the product features, $s_{i,t}^{rt}$ represents the correlation between the product i and the tag t, and $s_{u,t}^{ltp}$ represents the long-term preference estimation of the tag t for the user u, $w_{rt}$ and $w_{ltp}$ represent the weights to adjust relative importance between correlation and long-term preference.

According to another embodiment of the present disclosure, the processing unit 110 further generates a product feature list 350 according to the following formula:

$$r_{u,i,t} = w_{rt}s_{i,t}^{rt} + w_{fit}F(fb_{u,uTag}, fb_{u,iTag}, t) + w_p Pref_{u,t} \quad (6)$$

$$F(fb_{u,uTag}, fb_{u,iTag}, t) = \frac{|fb_{u,uTag} \cap fb_{u,iTag} \cap pf_t|}{|fb_{u,utag} \cup fb_{u,iTag} \cup pf_t|} \quad (7)$$

$$Pref_{u,t} = w_{op}s_{u,t}^{op} + w_{ltp}s_{u,t}^{ltp} \quad (8)$$

$s_{i,t}^{rt}$ represents the relationship between the product i and the tag t, $fb_{u,utag}$ is the set of customer tags selected by the user u, and $fb_{u,itag}$ is the set of product tags selected by the user, $Pref_{u,t}$ represents the preference estimation of the tag t for the user u. The preference estimation includes online preferences $s_{u,t}^{op}$ a and long-term preferences $s_{u,t}^{ltp}$.

Figure 3B:
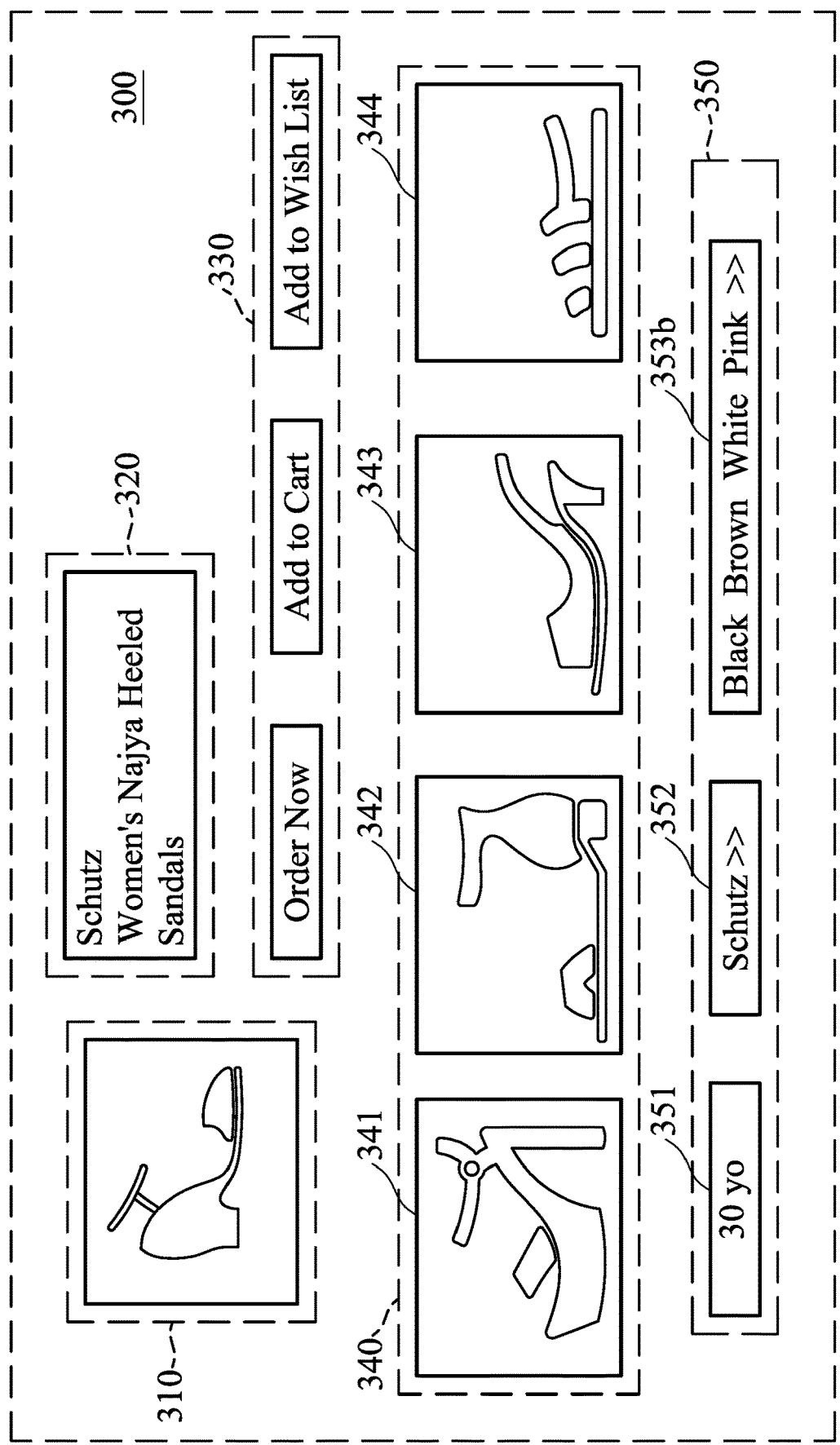

According to another embodiment of the present disclosure, the product feature tags displayed in the list of product feature tags 350 are expandable. For example, as shown in FIG. 3A, compared to product feature tag 354, product feature tag 353a also displays a double arrow ">>" or other icons to indicate that the product tag 353a is expandable. When the user clicks the product feature tag 353a, it can expand to a sub-tag list shown as "353b" in FIG. 3B. The sub-tags displayed in the sub-tag list 353b belong to the same type but have different attributes. For example, as shown in FIG. 3B, "Black", "Brown", "White", "Pink" and the like in the sub-tag list 353b are all colors. In addition, the sub-tag list is generated based on the interaction between the user and the product. The interactive behavior includes the user's click record, purchase record and/or browsing record. For example, the processing unit 110 may calculate a relevant scores of every two product features based on the interactive behavior of the user and the features of each product in advance through an associated analysis algorithm (such as AR, Co-Ocurrence or Matrix Factorization), and then filter out sub-tags with high correlation through a threshold, thereby to generate the sub-tag list 353b. The sub-tags in the sub-tag list 353b are further sorted according to the scores.

When the user clicks one or more tags in the list of product feature tags 350 or one or more sub-tags in the sub-tag list, the processing unit 110 may update the product list 340 according to the clicked tag/sub-tag.

It should be noted that the configurations of the icon 310, the product related information 320 of the tag list 330 corresponding to different transaction behaviors, the product list 340, and the product feature list 350 shown in FIGS. 3A and 3B are only an embodiment of the present disclosure, and a person skilled in the art can change the display configuration according to need, and it is not limited thereto.

Figure 4:
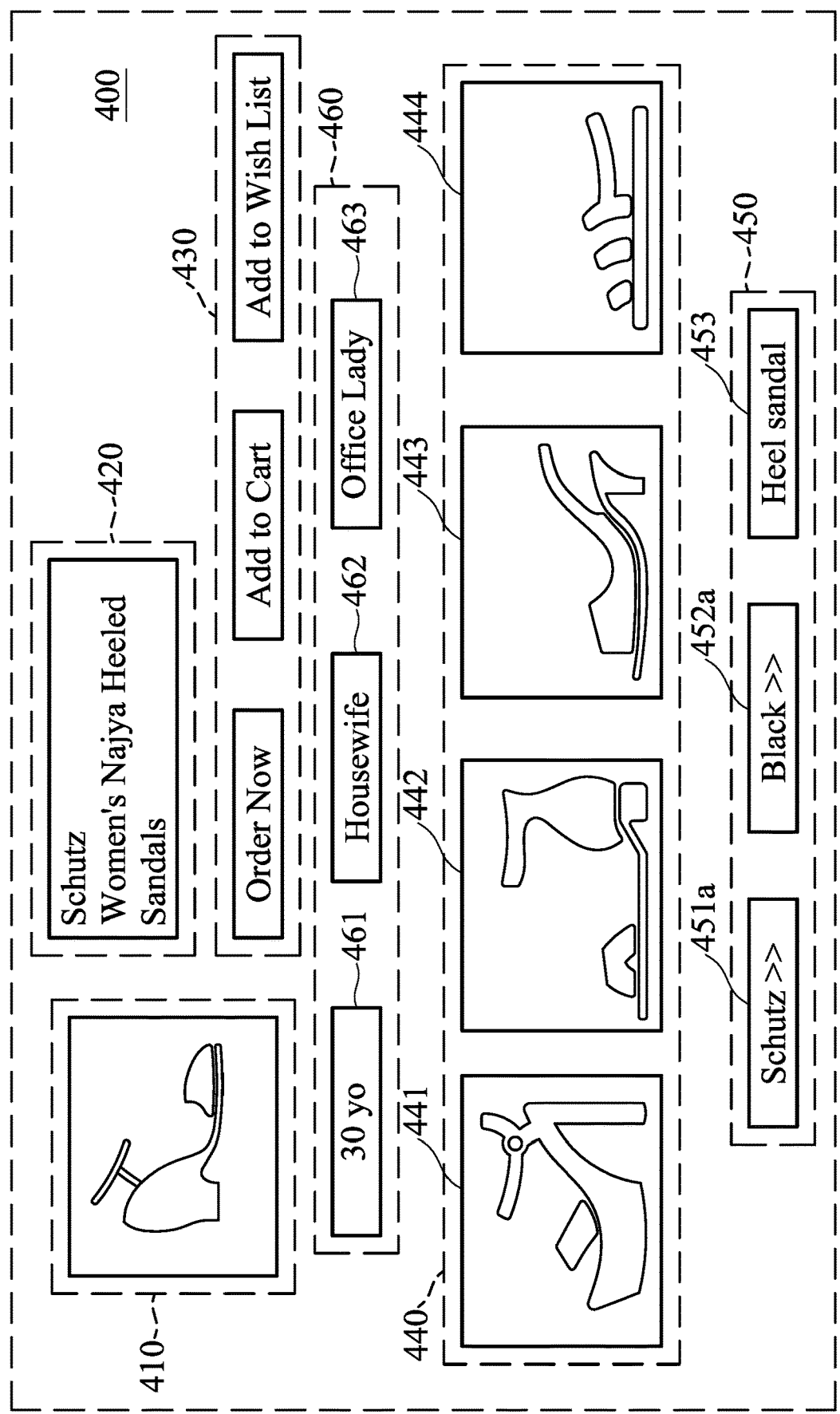
FIG. 4 is a schematic diagram of a user interface having a product list, a product feature tag list and a target customer characteristics tag list in accordance with an exemplary embodiment of the present disclosure.

FIG. 4 is a schematic diagram of a user interface having a product list, a list of product feature tags and a target customer characteristics tag list in accordance with an exemplary embodiment of the present disclosure. The contents of an icon 410, product related information 420, a tag list 430 corresponding to different transaction behaviors, a product list 440 and a product feature tag list 450 shown in FIG. 4 are similar to the icon 310, the product related information 320, the tag list 330 corresponding to different transaction behaviors, the product list 340, and the list of product feature tags 350 shown in FIGS. 3A and 3B, and they are not described herein to simplify the description. As shown in FIG. 4, the user interface of an embodiment of the present disclosure may further include a list of target customer characteristic tags 460. The list of target customer characteristic tags 460 represents the characteristics of each product preference group and the features of the preferred group of each product to generate the similarities between the product and the user characteristics, and the similarities between the user characteristics and the product features. For example, in this embodiment, the target customers of the clicked icon 410 are about the age group of "30 years old", the occupation of "housewife" or "office clerk" and the like. The processing unit 110 may obtain the list of target customer characteristic tags 460 according to a statistical analysis algorithm or a collaborative filtering basis algorithm. The statistical analysis algorithm uses the transaction records of products and target customers as well as the browsing history to estimate the probability of the products being purchased by the same user characteristics. The formula for statistical analysis algorithm is as follows:

$$Prob(fb_{Ii} | uTag) = \frac{Prob(uTag | fb_{Ii}) \cdot Prob(fb_{Ii})}{Prob(uTag)} \quad (9)$$

Prob($fb_{Ii}$|uTag) represents the probability that the product i will be fed back when the user attribute is uTag. Prob(uTag|$fb_{Ii}$) represents the probability that the product i is under the feedback event and the user attribute is uTag. Prob($fb_{Ii}$) is the probability of product i being fed back. Prob(uTag) is the probability of user attribute being uTag.

When the user clicks on one or more tags in the list of target customer characteristic tags 460, the processing unit 110 updates the product list and the list of product feature tags according to the clicked tag. The method for updating the product list is to use the formula (2) to calculate the r_uij scores of J candidate products and update the product list according to their ranking, and then select the top N recommendations according to the preset number of recommended products. The feature tag list is updated by using the formula (6) to calculate the r_uit scores of T candidate feature tags. The processing unit 110 sorts the candidate feature tags from high to low according to the scores and selects the top K recommendations according to the preset number of recommended products to update the feature tag list. It should be noted that, in this embodiment, when the user clicks the tag in the list of product feature tags, the processing unit 110 updates the product list only based on the clicked tag, and the tags in the list of target customer characteristic tags 460 will not be changed.

It should be noted that the configuration of the icon 410 shown in FIG. 4, the product related information 420, the tag list 430 corresponding to different transactional behaviors, the product list 440, the product feature tag list 450, and the list of target customer characteristic tags 460 and so on is only an embodiment of the present disclosure. A person skilled in the art may change the configuration according to need, and it is not limited thereto.

Figure 5:
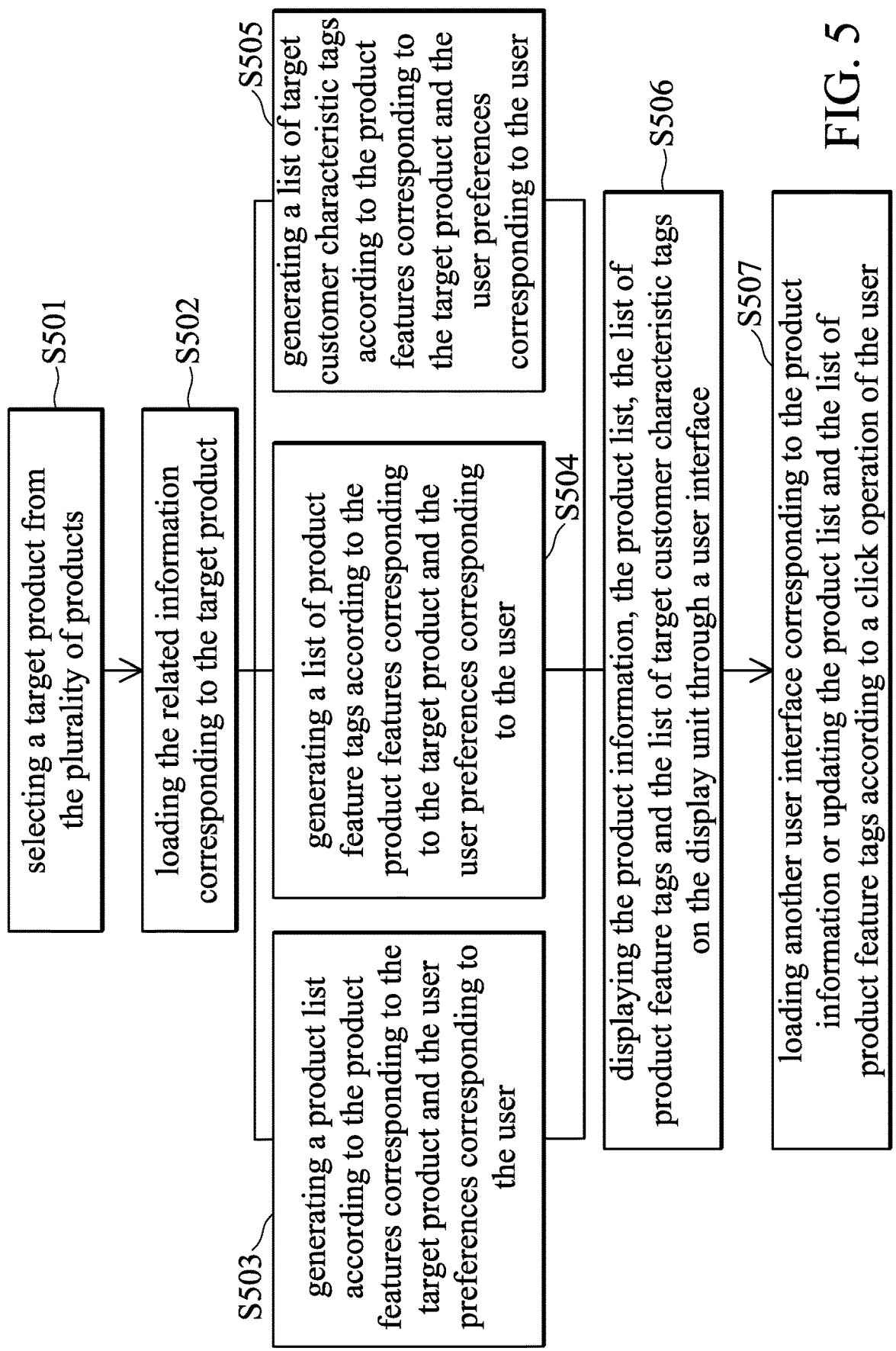
FIG. 5 is a flow chart of an interactive product recommendation method in accordance with one exemplary embodiment of the present disclosure.

FIG. 5 is a flow chart of an interactive product recommendation method in accordance with an exemplary embodiment of the present disclosure. In step S501, the user selects a target product from the plurality of products 210-230 displayed in the user interface 200. In step S502, the processing unit 110 loads the related information corresponding to the target product from the storage unit 120. In step S503, the processing unit 110 generates a product list according to the product features corresponding to the target product and the user preferences corresponding to the user. In step S504, the processing unit 110 generates a list of product feature tags according to the product features corresponding to the target product and the user preferences corresponding to the user. In step S505, the processing unit 110 further generates the list of target customer characteristic tags according to the product features corresponding to the target product and the user preferences corresponding to the user. After obtaining the product information, the product list, the list of product feature tags and the target feature tag list, the method proceeds to step S506, and the processing unit 110 displays the product information, the product list, the list of product feature tags and the list of target customer characteristic tags on the display unit 140 through the user interface. Finally, in step S507, the user performs an operation on the user interface through the input device, so that the processing unit 110 executes the corresponding operation according to the click operation of the user. For example, when the user clicks a picture corresponding to a product in the product list, the processing unit 110 loads and displays another user interface corresponding to the product information of the clicked product. Furthermore, when the user clicks the product feature list, the processing unit 110 updates the product list according to the clicked tag. When the user clicks the list of target customer characteristic tags, the processing unit 110 updates the product list and the product feature list according to the clicked tag.

The methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

As described above, according to the interactive product recommendation method, the non-transitory computer-readable medium of the present disclosure, and the product feature corresponding to the target product, various lists can be generated based on user preferences and/or target customers, etc. Furthermore, the features of the products that the customers are interested in can be fed back according to the feedback corresponding to the tags clicked by the customers in order to timely update the displayed product list. In this way, the customers will be presented with targeted products more efficiently, increasing the customers' motivation for further consumption.

It will be apparent to those skilled in the art that various modifications and variations can be made to the structure disclosed without departing from the scope or spirit of the invention. In view of the foregoing, it is intended that the present disclosure covers modifications and variations of this invention, provided they fall within the scope of the following claims and their equivalents.

What is claimed is:

1. An interactive product recommendation method, performed by a processor of an electronic device, comprising:
    choosing a target product from a plurality of products;
    loading product information corresponding to the target product;
    generating a product list having a plurality of icons corresponding to different products based on correlations between the products and a user preference corresponding to at least one user;
    generating a first tag list based on at least one product characteristic of the target product and the user preference corresponding to at least one user, wherein the first tag list includes a plurality of first tags identifying different product features, wherein the plurality of first tags comprise at least one first expandable tag corresponding to the product features;
    displaying the product information, the product list, and the first tag list through a first user interface;
    detecting a click on one of the icons in the product list;
    loading and displaying a second user interface having product information corresponding to the clicked icon;
    detecting a click on one of the first tags in the first tag list;
    updating the product list based on the clicked first tag;
    displaying the updated product list;
    calculating a score for every two product features based on a behavior-based association analysis method according to a historical record corresponding to one of said users;
    filtering, based on a threshold, the product features according to the score to generate a first sub-tag list;
    detecting a click on the first expandable tag; and
    loading and displaying the first sub-tag list when the first expandable tag is clicked.

2. The interactive product recommendation method as claimed in claim 1, further comprising:
    generating a second tag list based on preferred customer characteristics corresponding to the target product, wherein the second tag list has a plurality of second tags corresponding to different target customer characteristics.

3. The interactive product recommendation method as claimed in claim 2, further comprising:
    updating the product list and the first tag list according to a clicked second tag when any of the second tags is clicked.

4. The interactive product recommendation method as claimed in claim 1, wherein the first sub-tag list comprises a plurality of first sub-tags having the same type but different attributes.

5. The interactive product recommendation method as claimed in claim 1, further comprising:
    updating the product list according to a clicked first sub-tag when any of the first sub-tags is clicked.

6. The interactive product recommendation method as claimed in claim 1, further comprising:
    filtering the product features relative to the target product according to a behavior-based association analysis method or a content-based association analysis method.

7. The interactive product recommendation method as claimed in claim 1, further comprising:
    updating the user preferences according to a click behavior and/or one purchase behavior of the user.

8. The interactive product recommendation method as claimed in claim 1, wherein the product features comprise a brand, a product name, materials, a size, product efficacies, a price and/or a preference group characteristic.

9. The interactive product recommendation method as claimed in claim 8, wherein the preference group characteristics comprise gender, age group and/or residential area.

10. A non-transitory computer-readable medium having instructions stored therein, when the instructions are executed by a processor of an electronic device, operations performed by the electronic device comprise:
    choosing a target product from a plurality of products;
    loading product information corresponding to the target product;
    generating a product list having a plurality of icons corresponding to different products based on correlations between the products and a user preference corresponding to at least one user;
    generating a first tag list based on at least one product characteristic of the target product and the user preference corresponding to at least one user, wherein the first tag list includes a plurality of first tags identifying different product features, wherein the plurality of first tags comprise at least one first expandable tag corresponding to the product features;
    displaying the product information, the product list, and the first tag list through a first user interface;
    loading and displaying a second user interface having product information corresponding to a clicked icon when any of the icons in the product list is clicked;
    updating the product list based on a clicked first tag when any of the first tags in the first tag list is clicked;
    displaying the updated product list;
    calculating a score for every two product features based on a behavior-based association analysis method according to a historical record corresponding to one of said users;

filtering, based on a threshold, the product features according to the score to generate a first sub-tag list; and loading and displaying the first sub-tag list when the first expandable tag is clicked.

11. The non-transitory computer-readable medium as claimed in claim 10, wherein the operations performed by the electronic device further comprise:

generating a second tag list based on preferred customer characteristics corresponding to the target product, wherein the second tag list has a plurality of second tags corresponding to different target customer characteristics.

12. The non-transitory computer-readable medium as claimed in claim 11, wherein the operations performed by the electronic device further comprise:

updating the product list and the first tag list according to a clicked second tag when any of the second tags is clicked.

13. The non-transitory computer-readable medium as claimed in claim 10, wherein the first sub-tag list comprises a plurality of first sub-tags having the same type but different attributes.

14. The non-transitory computer-readable medium as claimed in claim 10, wherein the operations performed by the electronic device further comprise:

updating the product list according to a clicked first sub-tag when any of the first sub-tags is clicked.

15. The non-transitory computer-readable medium as claimed in claim 10, wherein the operations performed by the electronic device further comprise:

filtering the product features relative to the target product according to a behavior-based association analysis method or a content-based association analysis method.

16. The non-transitory computer-readable medium as claimed in claim 10, wherein the operations performed by the electronic device further comprise:

updating the user preferences according to a click behavior and/or one purchase behavior of the user.

17. The non-transitory computer-readable medium as claimed in claim 10, wherein the product features comprise a brand, a product name, a material, a size, a product efficacy, a price and/or a preference group characteristic.

18. The non-transitory computer-readable medium as claimed in claim 17, wherein the preference group characteristics comprise gender, age group and/or residential area.

* * * * *